United States Patent [19]

Friesen et al.

[11] 4,136,752
[45] Jan. 30, 1979

[54] VEHICLE BRAKE CONTROL SYSTEM

[75] Inventors: Larry D. Friesen; Stephen L. Palmer, both of Dallas, Oreg.

[73] Assignee: Towmotor Corporation, Mentor, Ohio

[21] Appl. No.: 796,568

[22] Filed: May 13, 1977

[51] Int. Cl.² ............................................. B60T 7/02
[52] U.S. Cl. ..................................... 180/101; 188/109
[58] Field of Search ....................... 180/100, 101, 102; 188/109

[56] References Cited

U.S. PATENT DOCUMENTS

| | | | |
|---|---|---|---|
| 2,968,967 | 1/1961 | Ross, Jr. ............................. | 74/472 |
| 3,332,522 | 7/1967 | Dence ................................. | 188/109 |
| 3,487,451 | 12/1969 | Fontaine ........................... | 188/109 X |
| 3,500,946 | 3/1970 | Boyajian ........................... | 180/101 |
| 3,507,350 | 4/1970 | Boyajian ........................... | 180/101 |
| 3,788,431 | 1/1974 | York ................................... | 188/109 |
| 3,892,294 | 7/1975 | Nieminski ......................... | 188/109 |
| 4,019,602 | 4/1977 | Habiger .............................. | 180/101 |

Primary Examiner—Richard A. Bertsch
Assistant Examiner—Michael Mar
Attorney, Agent, or Firm—Charles E. Lanchantin, Jr.

[57] ABSTRACT

A vehicle brake control system includes a brake having an engaged position and a disengaged position, a seat having an element movable between a first position corresponding to an occupied seat and a second position corresponding to an unoccupied seat, a control system connected to the brake for selectively operating the brake in the engaged and disengaged positions and being responsive to movement of the element to the second position for automatically placing the brake in the engaged position, and a brake actuating assembly having a control member movable between a brake engaged position and a brake disengaged position, the brake actuating assembly connected to the control system and being of a construction sufficient for automatically moving the control member to the brake engaged position in response to movement of the element to the second position.

10 Claims, 3 Drawing Figures

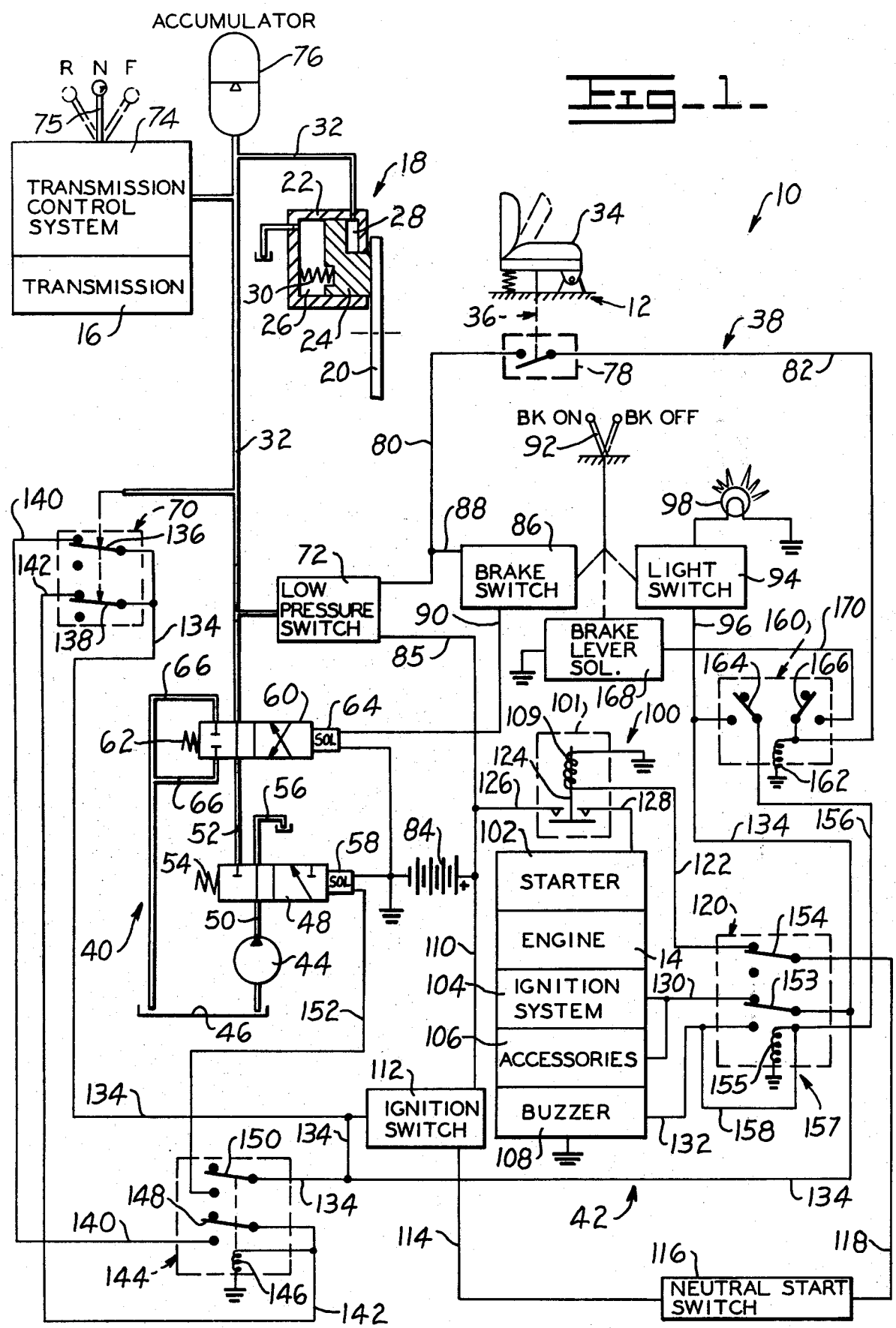

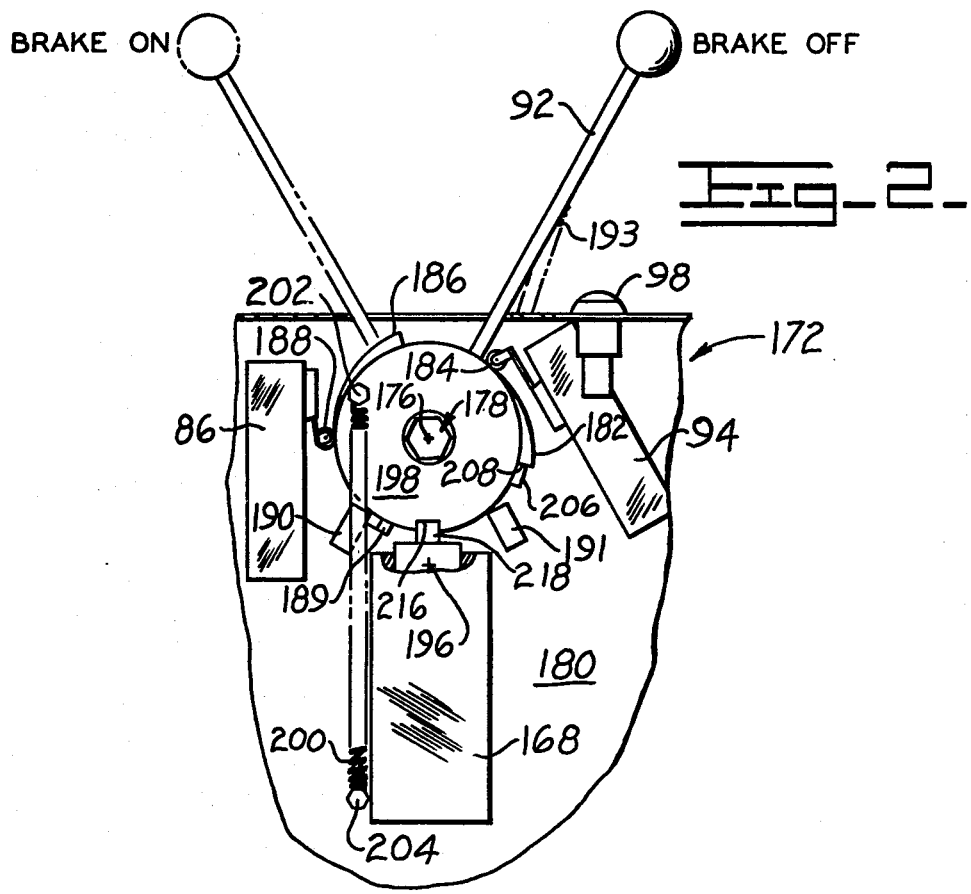
Fig_2_
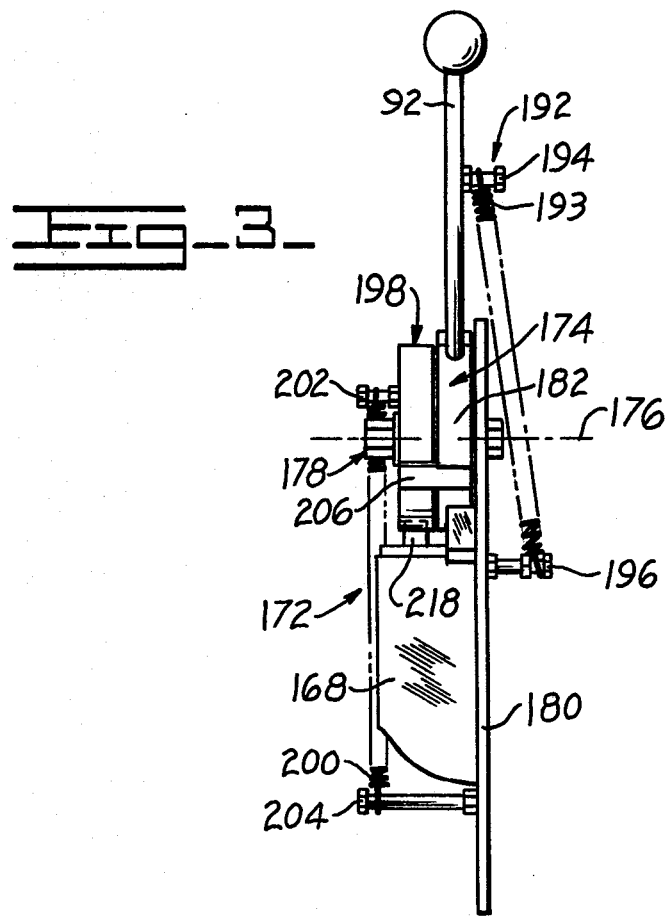
Fig_3_

VEHICLE BRAKE CONTROL SYSTEM

BACKGROUND OF THE INVENTION

The present invention is related to a brake control system for a vehicle which is responsive to automatically engage the brake when an operator leaves the seat.

Brake control systems are known for engaging and disengaging a parking brake, and which are at least partly automatic in action. For example, some fork lift truck control systems employ seat-associated devices which automatically serve to apply the parking brake when the operator leaves the seat. One of the disadvantages thereof is that even in the event that the operator would rise only instantaneously from the seat the parking brake could be applied without the operator expecting the action. This could be dangerous.

Another major difficulty with the prior art systems is that when the operator sits down again the parking brake is automatically disengaged by the action of the seat-associated device. If the vehicle is on an incline this could allow the vehicle to move before the operator is ready. Again, this automatic capability could be a hazard and a definite drawback to the positive and safe operation of the vehicle.

Still further, such prior vehicle brake control systems function substantially independently of the engine from the standpoint that the engine continues to run even after the operator has left the seat and the brakes of the vehicle have been applied. This also does not contribute to vehicle safety or economy of operation.

SUMMARY OF THE INVENTION

The present invention is directed to overcoming one or more of the problems as set forth above.

According to the present invention this is accomplished by providing a vehicle brake control system including a brake having an engaged position and a disengaged position, a seat having an element movable between a first position corresponding to an occupied seat and a second position corresponding to an unoccupied seat, a control system connected to the brake for selectively operating the brake in the engaged and disengaged positions and being responsive to movement of the element to the second position for automatically placing the brake in the engaged position, and a brake actuating assembly having a control member movable between a brake engaged position and a brake disengaged position, the brake actuating assembly connected to the control system and being of a construction sufficient for automatically moving the control member to the brake engaged position in response to movement of the element to the second position.

BRIEF DESCRIPTION OF THE DRAWINGS

FIG. 1 is a diagrammatic view of the vehicle brake control system of the present invention.

FIG. 2 is a side elevational view of a brake actuating assembly which is illustrated only diagrammatically in FIG. 1.

FIG. 3 is a front elevational view of the brake actuating assembly shown in FIG. 2.

DETAILED DESCRIPTION

Referring to FIG. 1, a vehicle brake control system 10 embodying the principles of the present invention is mounted on a vehicle designated generally by the reference numeral 12. A conventional engine 14, transmission 16, and associated drive train, not shown, are mounted within the vehicle for powered movement thereof and a spring engaged and fluid released brake 18 is associated with a rotatable element 20 of the drive train for restraining movement of the vehicle.

More particularly, the brake 18 includes a housing 22 with a piston 24 reciprocatingly mounted therein and defining with the housing a spring chamber 26 and a retraction chamber 28. A resilient element or spring 30 is connected to the housing within the spring chamber to continually bias the piston to its engaged position, or to the right when viewing the drawing. On the other hand, the piston is biased leftwardly to its disengaged or retracted position by fluid pressure communicated to the retraction chamber via a main supply conduit 32 as will later be explained.

An operator's seat 34 is mounted on the vehicle 12 and is of a construction such that an element associated therewith, identified generally by the reference numberal 36, is movable between a first or lowered position corresponding to occupied seat and a second or raised position corresponding to an unoccupied seat. This general relationship is diagrammatically indicated by the pivotally raised seat shown in broken lines — although it is to be appreciated that the entire seat need not be moved, but only one element thereof. The brake control system 10 is responsive to the occupancy of this seat.

In accordance with one aspect of the invention, control means 38 is connected to both the brake 18 and the seat element 36 for selective operation of the brake. Preferably, such control means includes a fluid or hydraulic control circuit 40 whose operation is effected by an associated electrical control circuit 42.

Referring initially to the hydraulic control circuit 40 located generally on the left side of FIG. 1, it includes a pump 44 which draws fluid from a reservoir 46 and communicates it to a solenoid-operated charging valve 48 via an input conduit 50. The charging valve is a basically two-position valve with flow controlling capability to an output conduit 52. It is mechanically biased to the right toward a closed position when viewing the drawing by a resilient member or spring 54, and in such position the fluid flow from the input conduit 50 is returned back to the reservoir 46 through a drain conduit 56 and the output conduit 52 is blocked. It is electrically biased to the left to an open position by activation of a solenoid 58 in response to preselected circumstances of the electrical control circuit 42.

The output conduit 52 is in communication with a solenoid-operated dump valve 60 which is also basically a two-position valve. It is mechanically biased to the right to an open position when viewing the drawing by a resilient member or spring 62, and in such position fluid flow is communicated directly through the valve from the output conduit 52 to the main supply conduit 32. It is electrically biased leftwardly to a dumping position by activation of a solenoid 64, also in response to conditions of the electrical control circuit 42 which will be subsequently described. In the dumping position of the valve the main supply conduit 32 is communicated with a drain passage 66, and the output conduit 52 from the pump 44 is also communicated with the same drain passage leading back to the reservoir 46.

The main supply conduit 32 leading to the brake 18 is also in open communication with a differential pressure switch 70, a low pressure switch 72, a transmission control system 74 and a cooperatively associated transmission control member 75, and a conventional accumulator 76 for storing fluid and decreasing pressure fluctuations in the main supply conduit.

Referring now to the electrical control circuit 42, it is seen to preferably include a two-position seat switch 78 which is solely responsive to movement of the seat element 36. Specifically, the seat switch is open when the seat is occupied so that under such conditions no electrical signal is communicated between an input line 80 and an output signal line 82. The input line is normally in communication with an electrical power source such as a battery 84 via a line 85 and the low pressure switch 72. The low pressure switch disconnects the input line 80 from the battery only when a pressure below a preselected minimum value; e.g., 30 psi, is experienced in the main brake fluid supply conduit 32.

A two-position brake switch 86 is also connected to the input line 80 by a branch line 88, and a line 90 leads from the brake switch to the solenoid 64 of the dump valve 60 for selective operation thereof. As will be subsequently explained in greater detail, selective manipulation of a two-position brake control lever 92 or automatic movement thereof opens or closes this brake switch. Simultaneously, movement of the brake control lever opens or closes a two-position light switch 94, so that when it is closed as a result of the lever moving to a brake-on position a normally electrically charged line 96 is connected to a light 98 for operation thereof.

The electrical control circuit 42 further includes engine control means 100 which is preferably connected to the battery 84, so that the engine 14 can be started, operated, and shut off. Preferably also, the engine control means includes an engine starting solenoid 101, a starter or starting mechanism 102, an engine ignition system 104, a plurality of engine accessories 106, and a warning buzzer 108. An operating coil 109 of the starting solenoid is connected to the battery via a line 110, an ignition switch 112, a line 114 connected to a neutral start switch 116, a line 118 communicating between the neutral start switch and a shut down control relay 120, and a lead line 122. When the operating coil 109 is energized, a movable contact 124 connects a line 126 from the battery or source of voltage to a line 128 connected to the engine starter for operation thereof.

The engine ignition system 104 and engine accessories 106 are both connected electrically to the shut down control relay 120 by way of a common lead line 130, and the buzzer is also connected to the same relay via a lead line 132.

The ignition switch 112 has an off or open position, a normal operating position, and a start position, and in the operating position of the engine 14 is closed so that a positive voltage signal is present in a main electrical line 134 at the outlet thereof. This line is in communication with the shut down control relay.

While a plurality of branch lines extend from the main electrical line 134, the same reference numeral is appended thereto for convenience. It is to be noted that the line 134 is in communication with the differential pressure switch 70, and particularly to a pair of movable contacts 136 and 138 thereof. In the absence of a preselected pressure in the main fluid supply conduit 32 of the hydraulic control circuit 40, these movable contacts respectively couple the line 134 to a pair of lines 140 and 142 communicating with a differential pressure relay 144. However, when the pressure in the main fluid supply conduit is within a preselected range these movable contacts are opened to interrupt the flow of electricity through the differential pressure switch.

The differential pressure relay 144 has an operating coil 146 connected to the input line 142, and when this input line is charged the coil closes a pair of movable contacts 148 and 150 which are illustrated in an open position. When the contact 150 is closed the main electrical line 134 is connected to the solenoid 58 of the charging valve 48 for activation thereof via a lead line 152. Simultaneously, the lines 140 and 142 are electrically coupled together.

It is to be noted that the main electrical line 134 is also in communication with a movable contact 153 within the shut down control relay 120. In a first position of the movable contact 153 the line 134 is connected to the ignition system 104 and the engine accessories 106 through the lead line 130. Under these conditions, another movable contact 154 couples the line 118 from the neutral start switch 116 to the lead line 122 and the starter operating coil 109. Further, the shut down control relay includes an operating coil 155 which is connected to a signal line 156, so that with power communicating with the signal line the coil simultaneously moves both of the contacts 153 and 154 to a second position, or downwardly when viewing FIG. 1. In the second position the contact 153 couples the lead line 132 to the signal line 156 and line 134, so that an audible noise is heard from the warning buzzer 108. Preferably, a holding circuit 157, including a connecting line 158 is incorporated in the shut down control relay as will later be explained.

In accordance with one of the features of the present invention, a time delay relay 160 is preferably connected to the output signal line 82 from the seat switch 78. Specifically, an operating coil 162 thereof is connected to the line 82 so that a positive signal thereat is sufficient to simultaneously position a pair of movable contacts 164 and 166 from their open positions illustrated to their closed positions after a preselected period of time; for example, in the order of several seconds, or preferably 2 to 3 seconds. In the closed position of the contact 166 the signal line 82 is connected to a brake control lever retention solenoid 168 via a line 170. At the same time the closing of the contact 164 communicates the main electrical line 134 to the signal line 156 which thereby serves to activate the coil 155 of the shut down control relay 120.

Referring now to FIGS. 2 and 3, it is contemplated that the brake switch 86, the brake control lever 92, the light switch 94, and the brake lever retention solenoid 168 are cooperatively associated elements of a brake actuating assembly identified generally by the reference numeral 172. Specifically, the brake control lever is secured radially to a first body or disc 174 which is pivotally mounted for rotation about an axis 176 on a bearing shaft means 178 secured to a stationary frame member 180. This first disc has a first ramp or cam surface 182 which extends radially outwardly from the periphery thereof for mating engagement with a follower 184 of the light switch 94, and a circumferentially offset second ramp or cam surface 186 for mating engagement against a follower 188 of the brake switch 86. An abutment bar 189 is attached to the periphery of the first disc so that it may make selective contact with either of a pair of stop blocks 190 and 191 secured to the frame member. In this way the rotation of the first disc is angularly limited between the two extremes.

As best shown in FIG. 3, an over-center spring apparatus 192 including a coiled tension spring 193 is secured at one end to the brake control lever 92 at a connection joint 194 and at the other end to the frame member 180 at a connection joint 196. With such construction the brake control lever is continually biased toward the brake off or brake on positions illustrated by the solid and broken lines respectively in FIG. 2.

A second body or disc 198 also forms a significant component of the brake actuating assembly 172. The second disc is also pivotally mounted on the bearing shaft means 178, and is continually biased to rotate in a counterclockwise direction when viewing FIG. 2 by a coiled tension spring 200 secured to the second disc at a joint 202 and secured to the frame member 180 at a joint 204. An abutment bar 206 is secured to the periphery of the second disc at a preselected point sufficient to make contact with an end surface 208 of the first ramp 182 when the brake control lever is in the position illustrated. A recess 216 in the second disc is in radial alignment with the axis of the retention solenoid 168, or more specifically is thereby aligned to receive a locking element or pawl 218. The pawl is continually resilient biased upwardly when viewing FIG. 2, and is retracted or lowered away from interlocking engagement with the second disc when the solenoid is actuated electrically.

OPERATION

Under normal driving conditions of the vehicle the operator is on the seat 34 so that the movable element 36 thereof maintains the seat switch 78 in the open position shown in FIG. 1. With the brake control lever 92 in the brake off position the brake switch 86 is open so that no electrical signal reaches the dump valve solenoid 64. This permits the engine driven pump 44 to supply additional pressurized fluid to the main supply conduit 32 if it is needed. Specifically, the differential pressure switch 70 and the differential pressure relay 144 together control the charging valve 48 to keep the hydraulic control circuit 40 charged within a preselected range; e.g., between 900 and 1500 psi in the main supply conduit. For example, any time that the pressure in the main supply conduit drops below such range the movable contacts 136 and 138 of the differential pressure switch assume the positions illustrated whereupon the operating coil 146 is energized to move both of the movable contacts 148 and 150 downwardly from the positions shown. Consequently the main electrical line 134, which is powered through the ignition switch 112 and the line 110, is connected to the line 152 leading to the solenoid 58 of the charging valve 48. This activates it to open the conduit 52 to the pump so that more fluid is directed to the main supply conduit 32 to continue to hold the brake 18 disengaged and to recharge the accumulator 76. When the pressure reaches the upper limit of the range the differential pressure switch 70 opens by movement of the contacts 136 and 138 in a counterclockwise manner from the positions shown. This disconnects the power supply in the line 134 and the line 142 so that the coil 146 of the differential pressure relay is again deenergized. Accordingly, the lead line 152 is disconnected from the power in line 134 and the charging valve moves to the right back to the inactive position illustrated.

In the event the operator wishes to manually apply the brake 18, the brake control lever 92 is moved in a counterclockwise manner when viewing FIG. 2 so that the brake switch 86 is closed by movement of the cam surface 186 relative to the follower 188, and also the light switch 94 is closed by movement of the cam surface 182 relative to the follower 184. The main electrical line 134 in FIG. 1 is thus connected to the light 98 to alert the operator that the brake is engaged, and simultaneously power from the battery 84 is communicated to the dump valve solenoid 64 via the line 85, the low pressure switch 72, the lines 80 and 88, the brake switch, and the line 90. This positions the dump valve 60 to the left, opening the main supply conduit 32 to the reservoir via the drain passages 66. However, even under these conditions the construction of the hydraulic control circuit 40 is advantageously such that the pressure in the main supply conduit 32 remains at a nominally low value which is above the pressure setting which would open the low pressure switch in order to keep the electrical control circuit 42 responsive to the seat switch 78.

Assuming next that the engine 14 is running with the operator sitting on the seat 34 and the brake control lever 92 disposed in the brake off position, it is to be noted that there is no electrical power transmission to the signal line 82 and to the time delay relay 160 because the seat switch 78 is open. In the event of any brief movement of the operator from the seat, such as may occur when the vehicle travels over a large bump, the period of time therefor is sufficiently short in duration that the time delay relay advantageously will not respond to the relatively instantaneous closing of the seat switch. On the other hand, should the seat remain unoccupied beyond the preselected setting of the time delay relay, in the order of several seconds as previously mentioned, then the brake 18 is automatically applied.

In accordance with the present invention, closing of the seat switch 78 results in the operating coil 162 being energized via the line 82, the seat switch, the line 80, the low pressure switch 72 and the line 85 leading to the battery 84. This actuates the time delay relay so that after the period of several seconds both of the movable contacts 164 and 166 are closed. Closing of the contact 166 communicates power from the signal line 82 to the line 170 and the brake control lever retention solenoid 168 so that the pawl 218 shown in FIG. 2 is retracted from interlocking engagement with the second disc 198 of the brake actuating assembly 172. As a result, the spring 200 causes the second disc to move in a counterclockwise direction when viewing the drawing whereupon the bar 206 acts against the end surface 208 of the first disc 174 to move it also in the counterclockwise direction. Thus, the brake control lever 92 is automatically moved to the brake on position shown in phantom in FIG. 2. This actuates the light switch 94 and the brake switch 86 in the same manner as described above with respect to the manual movement of the brake control lever.

In accordance with one aspect of the invention the transmission 16 is automatically placed in neutral when the brake control lever 92 is disposed in the brake on position. As stated previously, the pressure in the main fluid supply conduit 32 is released as a result of the solenoid 64 being powered and the dump valve 60 being activated. Such reduced pressure is communicated to the transmission control system 74 via the conduit 32 as shown in FIG. 1. This transmission control system has a plurality of working modes of operation corresponding to the usual traveling directions and speed ranges of the transmission, and a neutral mode of operation, and is of a construction sufficient for reacting to the reduced pressure and automatically changing to the neutral mode of operation and disengaging the transmission.

Pursuant to another aspect of the invention, the engine 14 is also automatically shut down in response to the closing of the seat switch 78 for the preselected period, and with engagement of the brake 18. When the operating coil 162 of the time delay relay 160 is actuated as described heretofor, the movable contact 164 is closed so that power in the electrical line 134 is communicated to the signal line 156. This activates the operating coil 155 of the shut down control relay 120, and also the warning buzzer 108 indicating that the ignition switch 112 is in the operating position via the lines 158 and 132. Both of the contacts 153 and 154 are thereby displaced downwardly when viewing FIG. 1 so that power is no longer supplied to the lead line 130. As a consequence of this power interruption to the ignition system 104 and accessories 106 the engine 14 is shut off.

Likewise, it is contemplated that the engine 14 can be started only with the vehicle operator disposed on the seat 34 and the seat switch 78 disposed in the open position as a result of the seat element 36 being depressed. In general, it is to be appreciated that only the seat switch 78 influences the engine control means 100, and not the disposition of the brake control lever 92. Otherwise, the engine is started in the usual manner; namely by manual positioning of the ignition switch 112 to the start position so that power from the battery 84 is communicated to both the lines 114 and 134. Power in the main electrical line 134 is subsequently available to the shut down control relay 120, the time delay relay 160, the light switch 94, the differential pressure relay 144 and the differential pressure switch 70 as stated heretofor. Power from the battery 84 is simultaneously communicated through the line 114, the neutral start switch 116, the line 118, the contact 154, the lead line 122 to the starter operating coil 109. This actuates the starting solenoid 101 and connects the starter 102 to the power source via the lines 126 and 128 and the movable contact 124 so that the initial rotation of the engine is effected. Since the contact 153 is in the position illustrated the ignition system 104 functions to operate the engine.

Neutral start switch 116 is advantageously in the control circuit 42 solely to prevent inadvertent starting of the vehicle in other than a neutral position of the transmission control system 74 for safety purposes.

Referring now to the holding circuit 157, it is to be noted that such circuit prevents restarting of the engine 14 or restoration of the accessories 106 after any automatic shut-down as a result of closing of the seat switch 78 until the ignition switch 112 is manually shut off. Particularly, once the shut down control relay 120 is actuated by the time delay relay 160 it will remain actuated through the holding circuit 157 so that no power is communicated to the starting mechanism 102, the ignition system 104 and the accessories 106, and will continue to communicate power to the warning buzzer 108, until the system is reset. The only way to reset it is to cycle the ignition switch to the off or open position. In other words, main electrical line 134 is connected to lines 132 and 158 by counterclockwise movement of contact 153 because this is what keeps the holding circuit or shutdown system energized once the power is removed from the coil 162, by either the return of the vehicle operator to the seat 34 or the removal of power from the line 80.

Moreover, the low pressure switch 72 is provided basically only to completely disconnect the electrical power source or battery 84 from the solenoid 64 of the dump valve 60 and the time delay relay 160.

Other aspects, objects and advantages of this invention can be obtained from a study of the drawing, the disclosure, and the appended claims.

The embodiments of the invention in which an exclusive property or privilege is claimed are defined as follows:

1. In a vehicle brake control system of the type including a brake having an engaged position and a disengaged position; a seat having an element moveable between a first position corresponding to an occupied seat and a second position corresponding to an unoccupied seat; and control means connected to the brake for selectively operating the brake in said engaged and disengaged positions and being responsive to movement of said element to said second position for automatically placing the brake in said engaged position; the improvement comprising:

a brake actuating assembly having a control member moveable between a first position solely corresponding to said brake engaged position and a second position solely corresponding to said brake disengaged position, said brake actuating assembly connected to said control means and being of a construction sufficient for automatically moving the control member to said first position in response to movement of said element to said second position said control member being solely manually movable from said first position to said second position.

2. The brake control system of claim 1 wherein said brake is spring applied and fluid released, and said control means includes passage means for supplying fluid at a preselected pressure to the brake holding it in said disengaged position and a transmission control system connected to said passage means, said transmission control system being of a construction sufficient for being automatically placed in a neutral condition when pressure in said passage means is below said preselected pressure.

3. The brake control system of claim 1 wherein said brake is spring applied and fluid released, and said control means includes passage means for supplying fluid at a preselected pressure to the brake holding it in said disengaged position and valve means for releasing pressure in said passage means in response to movement of said element to said second position, said valve means including an electrically operated dump valve and said control means including an electrical control circuit connected to said dump valve for operation thereof.

4. The brake control system of claim 3 wherein said electrical control circuit includes a normally open parking brake switch which is closed in response to movement of said control member to said first position.

5. The brake control system of claim 1 wherein said brake is spring applied and fluid released, and said control means includes passage means for supplying fluid at a preselected pressure to the brake holding it in said disengaged position and valve means connected to said passage means for releasing pressure therein in response to movement of said element to said second position, said brake actuating assembly has a body pivotal about a stationary axis, said control member is secured to said body, and said control means includes electrical control circuit means responsive to pivotal movement of said control member and said body to said first position for effecting movement of said valve means and releasing pressure in said passage means below said preselected pressure.

6. A vehicle brake control system comprising:
a brake having a spring engaged position and a fluid released position;
a brake actuating assembly having a control member and operatively associated cam element, said cam element being movable between a first position and a second position with corresponding movement of the control member;
control means connected to the brake for selectively operating the brake, said control means including an electrical control circuit and a hydraulic control circuit, said hydraulic control circuit including a supply conduit and means for delivering fluid at a preselected pressure to the supply conduit and to the brake maintaining said released position thereof, said electrical control circuit connected to said hydraulic control circuit and being of a construction sufficient for releasing said preselected pressure in said supply conduit in response to movement of said cam element to said second position.

7. The brake control system of claim 6 wherein said electrical control circuit includes a source of electricity and a brake switch connected to said source of electricity, said hydraulic control circuit includes an electrically operated dump valve connected to said supply conduit and said brake switch, and said brake switch is responsive to movement of said cam element to said second position to communicate said source of electricity to said dump valve reducing the pressure in said supply conduit below said preselected pressure.

8. In a vehicle brake control system of the type including a brake having an engaged position and a disengaged position, a seat having a seat element moveable between a first position corresponding to an occupied seat and a second position corresponding to an unoccupied seat, and control means for selectively operating the brake in said engaged and disengaged positions, the improvement comprising:
a brake actuating assembly having first and second juxtaposed elements pivotally mounted on a common axis, said first element selectively connected to said control means and being moveable between a brake engaged position and a brake disengaged position, said assembly including means for biasing said second element from a neutral position pivotally in a preselected direction for contacting and urging said first element toward said brake engaged position; and
retention means for retaining said second element in said neutral position substantially free of biasing contact with said first element when said seat element is in said first position and for automatically releasing said second element and biasing said first element toward said brake engaged position when said seat element is in said second position, said retention means being connected to said control means.

9. The brake control system of claim 8 wherein said second element is returned to said neutral position solely by manual movement of said first element to said brake disengaged position.

10. The brake control system of claim 8 wherein said retention means includes a locking pawl having an extended position of locking engagement with said second element in said neutral position and a retracted position free of contact with said second element.

* * * * *